No. 721,820. PATENTED MAR. 3, 1903.
J. J. MOULE.
TRUCK.
APPLICATION FILED FEB. 19, 1902.
NO MODEL. 2 SHEETS—SHEET 1.
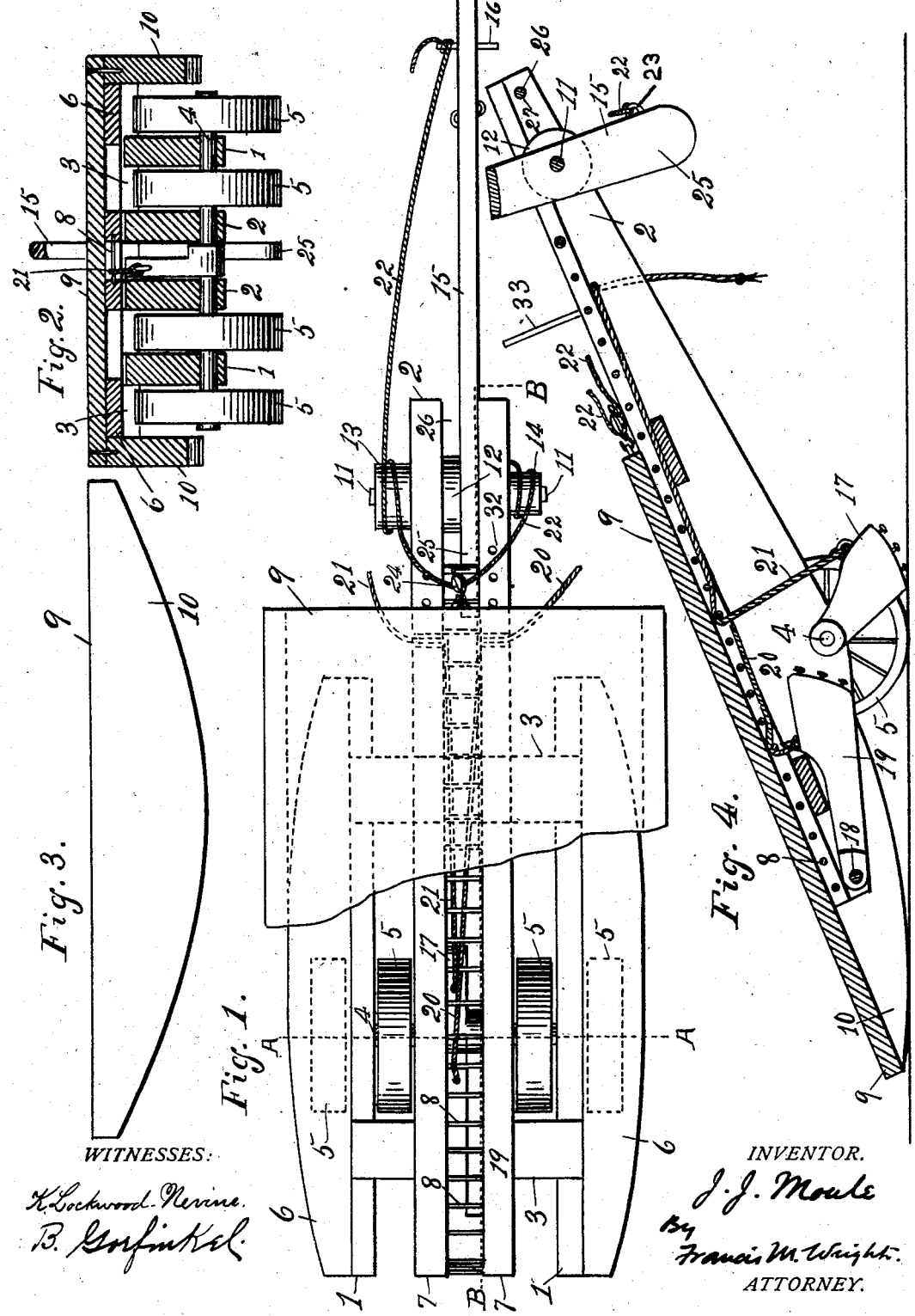
WITNESSES:
K. Lockwood Nevine.
B. Gorfinkel.
INVENTOR.
J. J. Moule
By Francis M. Wright.
ATTORNEY.

No. 721,820. PATENTED MAR. 3, 1903.
J. J. MOULE.
TRUCK.
APPLICATION FILED FEB. 19, 1902.
NO MODEL. 2 SHEETS—SHEET 2.
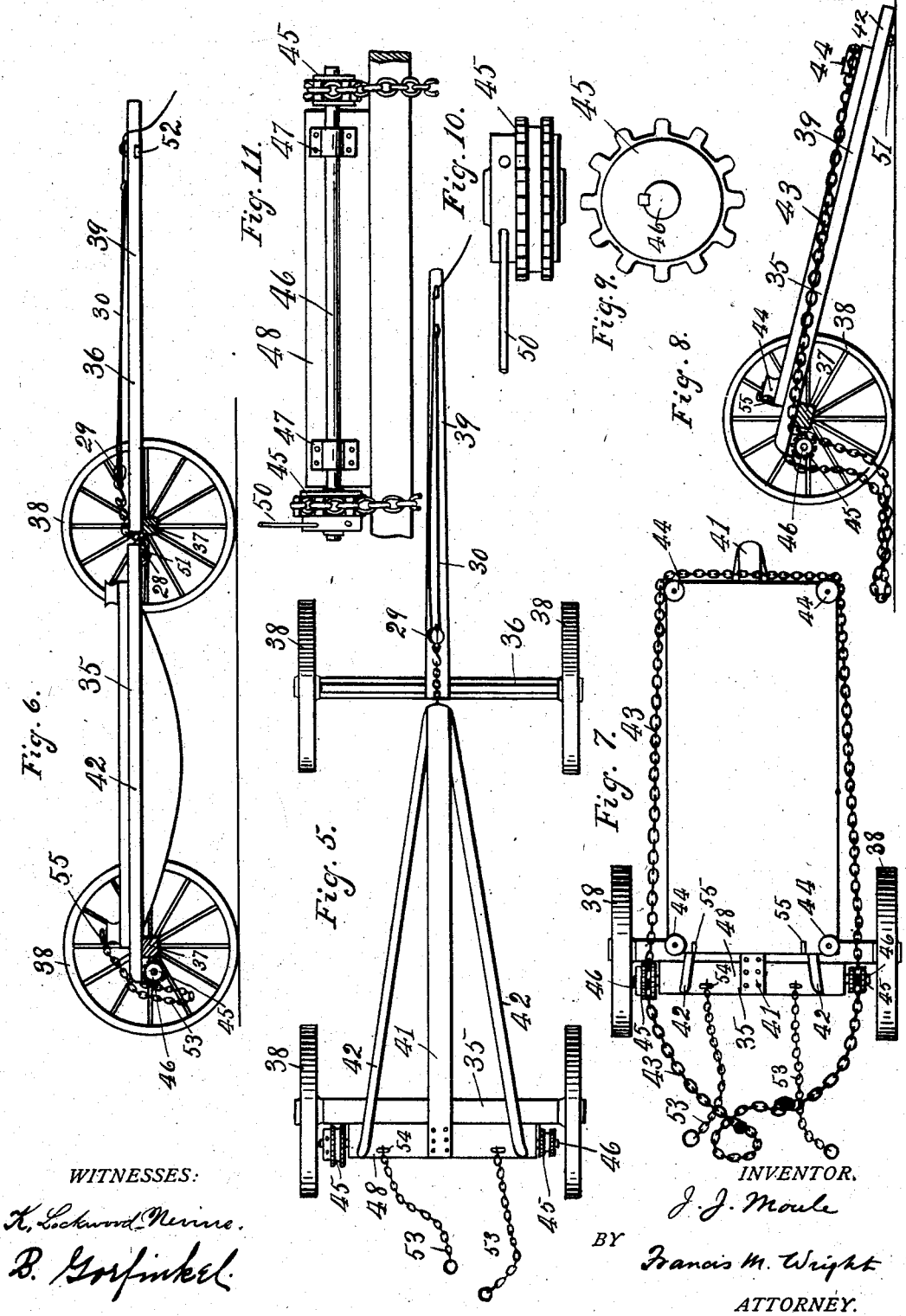
WITNESSES:
K. Lockwood Nevins.
B. Gorfinkel.
INVENTOR.
J. J. Moule
BY Francis M. Wright
ATTORNEY.

UNITED STATES PATENT OFFICE.

JOHN J. MOULE, OF SAN JOSE, CALIFORNIA.

TRUCK.

SPECIFICATION forming part of Letters Patent No. 721,820, dated March 3, 1903.

Application filed February 19, 1902. Serial No. 94,797. (No model.)

*To all whom it may concern:*

Be it known that I, JOHN JAMES MOULE, a citizen of the United States, residing at San Jose, in the county of Santa Clara and State of California, have invented certain new and useful Improvements in Trucks, of which the following is a specification.

My invention relates to improvements in trucks used for loading, transporting, and unloading material, and is an improvement upon the devices shown in my Letters Patent numbered 671,222, dated April 2, 1901.

The objects of my present improvements are to provide a truck which shall be simpler in construction, of greater efficiency, having a greater leverage for tilting the truck to lift the load thereonto, having improved means for shifting said load onto said truck, also for shifting the same rearwardly on said truck, and one which shall avoid undue handling of the material, and thereby economize in transportation.

I also provide in connection with my invention a modified form of truck for use on rough roads.

My invention therefore resides in the novel construction, combination, and arrangement of parts for the above ends, hereinafter fully specified, and particularly pointed out in the claims.

In the accompanying drawings, Figure 1 is a plan view of my improved truck, showing the loading-platform in position thereon, but with parts thereof broken away. Fig. 2 is a cross-section thereof on the line A A of Fig. 1. Fig. 3 is a side elevation of the loading-platform. Fig. 4 is a longitudinal section of the rear portion thereof in a tilted position, taken on the line B B of Fig. 1. Fig. 5 is a plan view of a modified form of truck adapted for transporting the loading-platform and the contents thereof on rough roads. Fig. 6 is a side elevation of the same with platform. Fig. 7 is a plan view showing the loading-platform on the rear portion thereof in an intermediate position when being shifted rearwardly for dumping the same. Fig. 8 is a side view of the same. Fig. 9 is a plan view of one of the windlasses. Fig. 10 is a side view of the same. Fig. 11 is a bottom view of the axle, with the support for the shaft of the windlass.

Referring to the drawings, 1 represents the two side beams, and 2 represents two intermediate beams. Said side beams are connected by the cross-beams 3. In said beams 1 2 is mounted the axle 4, upon which are the rollers 5, upon which the truck is supported. On the ends of said cross-beams are supported the two skids 6, and upon the intermediate longitudinal beams are also supported the two central skids 7, said skids 6 and 7 being all at the same level. Said central skids are connected by rungs or bolts 8, forming, as it were, a ladder, the object of which is to provide successive points of leverage by means of which a lever can be applied to the end of the loaded platform to shift the same backward along the skid 4. The loading-platform comprises the platform proper, 9, and the sides 10, depending therefrom and curved to form rockers. For the purpose of drawing the loaded platform forward on said skids I provide the following construction: The central beams 2 are extended considerably forward of the side beams 1, and in the ends thereof is mounted a shaft 11, upon which are loosely pivoted rollers 12 13 14. The largest roller 12 is pivoted on said shaft between the two beams, and the other rollers 13 14 are pivoted on the ends of the shaft 11, projecting beyond the beams. Also pivoted upon the same is a pole or handle 15, which is used for drawing the loaded platform up onto the truck. For this purpose the end of the pole is provided with a cleat 16. Said pole also extends beyond the pivotal shaft—that is, below the same when the pole is raised, as shown at 25. On the main axle 4 of the truck is loosely mounted a leg 17, having spikes in its foot, and upon a shaft 18 at the rear end of the truck is also mounted a similar leg 19. The operation of this portion of the device is as follows: First, the platform, standing level on its rockers, is loaded with the brick, iron, stone, or any other material which it is desired to transport. Then the truck, its legs 17 19 being raised by means of the cords 20 21, is thrust underneath the front end of the platform, thereby causing it to rock upon its rockers 10 until the rear end comes in contact with the ground. It is now necessary to draw the platform onto the truck. For this purpose a rope 22 is attached to a hook 23 on the front or lower edge of the lever. It is then passed over the upper side of the roller 12 and through a block 24, attached to the front edge of the platform. It then returns and passes over the upper side of the roller 13, then around the same, then up to and around the cleat 16 at the top of the pole, and is then carried to a convenient position to haul upon the same. The operator thus obtains a long leverage. The rope is passed around the rollers 12 and 13 and the block 24, so that by pulling down upon the pole the platform is drawn up onto the truck. Then raising the pole again and taking up the slack the operator repeats the operation until the loaded platform is drawn to the desired position to balance upon the truck. When the pole is pulled down, the leg 17 sticking into the ground prevents the truck from drawing out from under the platform. For the purpose of adjusting the power which can be exerted to correspond with the load upon the platform the rollers 12 13 14 are made of different diameters. These rollers may also be used differentially—that is to say, instead of passing the rope 22 over the top of either of the outside rollers it may be passed underneath the same and then up to the cleat, in which case the leverage may be very greatly increased. Thus supposing the length of the pole is eight feet from the pivot to the cleat, the diameter of the middle roller is twelve inches, and that of one of the side rollers is eight inches, then first of all from the lever itself is obtained an advantage in the proportion of eight feet to six inches, the radius of the middle roller—that is, an advantage of sixteen to one. This again is increased in the proportion of the diameter of the larger to the difference between the diameters of the two rollers—that is to say, in the proportion of three to one—so that the total leverage is forty-eight to one. By this means the loaded platform, even though it may be of great weight, can be drawn up by hand-power onto the truck to the desired position. Having been placed on the hand-truck in the desired position, it can be transported to any desired point, and for this purpose the pole can be thrown up, so as to permit of a bolt 26 being inserted through eyes 27 in the ends of the central beams, to which bolt may be hooked a hook 28, attached to a block 29, through which will pass a rope 30, extending to the front end of the pole 39 of the forward part of the truck. (Shown in Figs. 5 and 6.) By this means the hand-truck can be transported by horse-power to any desired place. The leg is for the purpose of moving the truck close up to any desired point of unloading. It operates in the same manner on the legs 11 12 13 14 in my prior patent above mentioned. It is for this purpose also that the pole has the downward extension 25. Said downward extension engages the ground and serves as a fulcrum upon which to pry the truck forward with the pole 15 as a lever.

In the upper edges of the central beams 2 are formed holes or sockets 32 in series, in any one of which may be inserted a crowbar 33, which acts as a stop, limiting the movement of the loading-platform. Said crowbar may also be used as a lever in conjunction with the rungs.

The truck shown in Figs. 1, 2, 3 is a hand-truck, preferably for use in the yard of the factory where the material is produced. Supposing that it is necessary to transport the loaded platform along rough roads, for which the truck shown in Figs. 1, 2, and 3 is not suitable, I use for this purpose the truck shown in Figs. 5 and 6. This truck consists of two parts 35 36, separable from each other, each comprising an axle 37 and a pair of wheels 38, mounted thereon. The front part 35 has a tongue 39 fixedly secured to its axle, and the rear part 36 has secured to its axle a frame comprising a central piece 41 and side pieces 42, obliquely secured at their front ends to the central piece 41 and at their rear ends to the rear axle, thus forming a triangular frame. Said central and side pieces constitute skids upon which the loading-platform can slide. The method of raising said platform, with its load, onto said truck is as follows: First, the rear section of the truck is separated from the front section, and then the triangular frame of the rear section is pushed along underneath said platform as far as possible until the front end thereof projects beyond the front end of the platform, at the same time causing said platform to rock upon its rockers. Then an endless chain 43 is passed around sheaves 44, secured at the corners of said platform, and is then passed over windlasses 45, mounted upon a shaft 46, secured in bearings 47 below a rearward extension 48 of the rear axle. Said windlasses are caused to rotate by a lever 50, or the chain may be secured at one side and the windlass at the other side only may be used by which the power applied may be doubled. By this means the load may be drawn onto the rear section to a sufficient distance that the center of gravity thereof may lie so nearly over the axle as to render it quite easy to tilt said rear section. For this purpose the hook 28 is attached to an eye 51 in the front end of the frame of the rear section, so that by drawing outward said hook the front end of said frame is raised to its proper position. The rope 30 is then secured to a cleat 52 upon the tongue 36, and the two sections are securely attached together, so that they form a wagon. It may be observed, however, that the above operation can be performed without a lever or windlass and direct by horse-power or steam. For the purpose of dumping the platform from the wagon thus formed there are provided chains 53, attached to hooks 54 on the rear end of the wagon. The other ends of said chains may be attached to hooks 55 at the rear side of the loading-platform. Then if the platform be shifted by means of the chain 43 and windlasses 45 still farther to the rear and its rear end travels beyond the rear end of the wagon the chains 53, connecting said rear ends together, will cause the platform to tilt, so that it can be dumped upon its rockers.

A great advantage arising from this construction is that the platform containing its load of bricks or other material can be deposited at any desired place without any injury to the material, since on withdrawing the truck or the section of the truck from underneath the platform said platform falls gradually and is prevented from receiving any shock by means of the rockers upon which it rests. Thus the material is delivered in a neat and uninjured condition precisely as it came from the factory, and it may be stored in like condition until the time of use.

I claim—

1. In combination with a truck, a loading device comprising a platform extending from front to rear of the device, and sides depending therefrom, said device being open at the front and rear, and the sides being sufficiently spaced apart and the space between said sides being entirely unobstructed to permit the truck to be pushed thereunder to raise the platform bodily, the lower edges of said sides being symmetrical with reference to the two ends of the platform, substantially as specified.

2. In combination with a loading-platform comprising the platform proper and the sides depending therefrom and resting on the ground to form supports, a truck having longitudinal skids above the wheel-axle and having a wheel-axle, and tiltable thereon whereby one end can be inserted beneath said platform and between said sides, a windlass carried on said truck, its axle rotating parallel to the wheel-axle of the truck, a device secured to the platform, and a chain moving around said device and operated by said windlass, to draw the platform onto the truck, substantially as described.

3. A truck comprising separable, front and rear sections, each having a wheel-axle, the rear section having a central piece and side pieces obliquely secured at their front ends to the central piece and at their rear ends to the rear axle, the upper surface of said central and side pieces extending over said axle and to the rear thereof, a rearward extension of said rear axle below the rearwardly-extending ends of said pieces, a shaft having bearings in said extension, and windlasses on said shaft, substantially as described.

In witness whereof I have hereunto set my hand in the presence of two subscribing witnesses.

JOHN J. MOULE.

Witnesses:
FRANCIS M. WRIGHT,
B. GORFINKEL.